F. G. HINSDALE.
HARPOON.
APPLICATION FILED JAN. 4, 1919.
1,344,693.
Patented June 29, 1920.
2 SHEETS—SHEET 1.
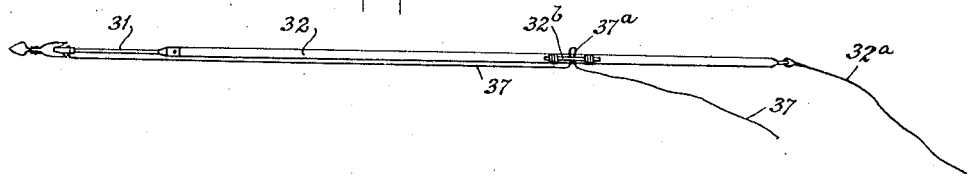
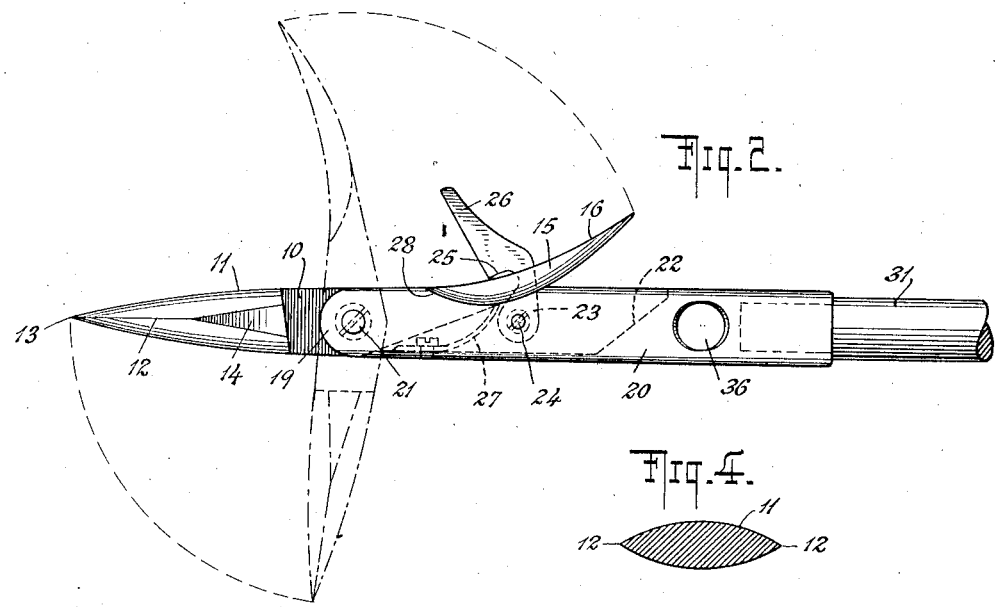
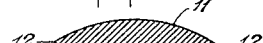
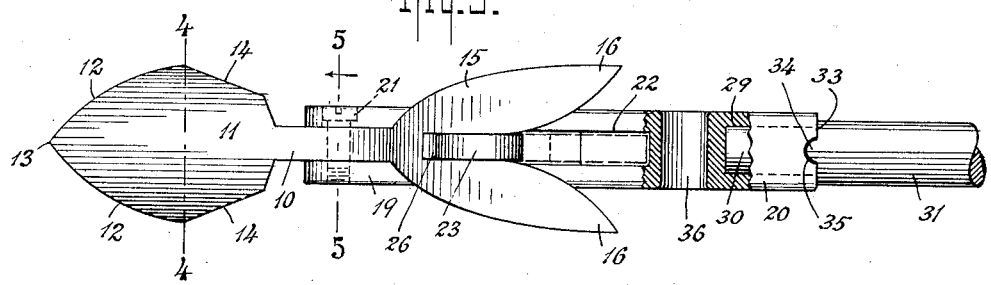
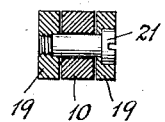
WITNESSES
INVENTOR
F. GILBERT HINSDALE
BY
ATTORNEYS F. G. HINSDALE.
HARPOON.
APPLICATION FILED JAN. 4, 1919.
1,344,693.
Patented June 29, 1920.
2 SHEETS—SHEET 2.
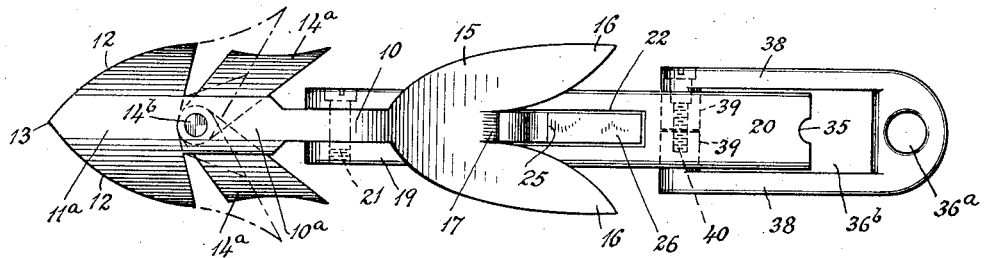
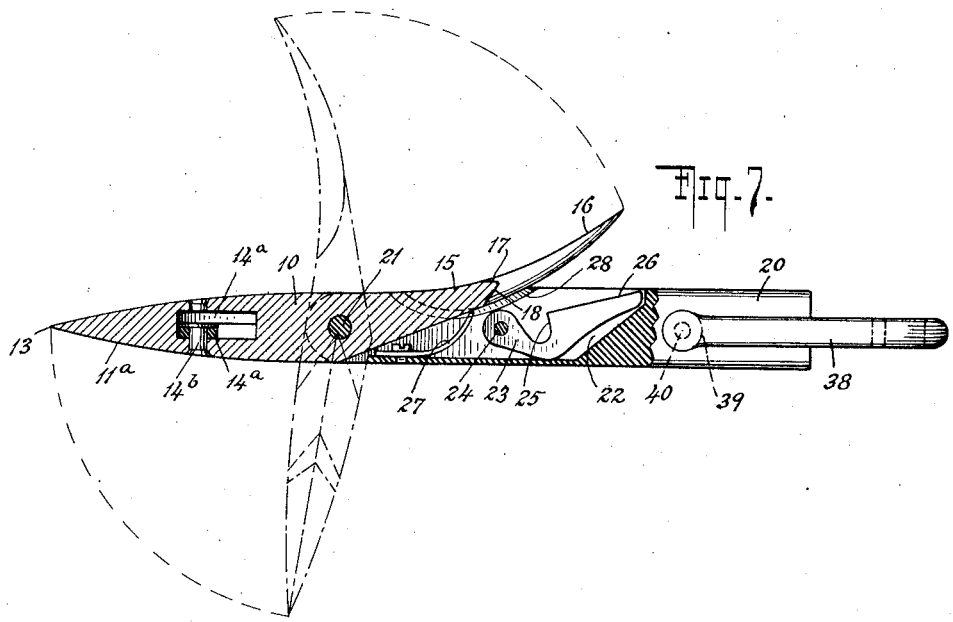
WITNESSES
INVENTOR
F. GILBERT HINSDALE
BY
ATTORNEYS

UNITED STATES PATENT OFFICE.

FRANK GILBERT HINSDALE, OF NEW YORK, N. Y.

HARPOON.

1,344,693.  Specification of Letters Patent.  Patented June 29, 1920.

Application filed January 4, 1919. Serial No. 269,574.

*To all whom it may concern:*

Be it known that I, FRANK GILBERT HINSDALE, a citizen of the United States, and resident of the borough of Manhattan, city, county, and State of New York, have invented certain new and useful Improvements in Harpoons, of which the following is a specification.

My invention relates to harpoons and more particularly to that type thereof commonly known as "lily irons" in which the iron is separated from the pike after having embedded itself in the fish subsequent to the cast. The object of my invention is to improve the construction of the iron in a manner to facilitate its separation from the pike at the proper time and its penetration or entry into the body of the fish at any point and to reduce the possibility of its unintentional withdrawal after having struck, to a minimum. A further object of my invention is to provide an iron constructed in a manner to minimize the laceration or cutting of the fish as much as possible. Other more specific objects will appear from the description hereinafter and the features of novelty will be pointed out in the appended claims.

In the accompanying drawings, which, for illustrative and descriptive purposes show examples of my invention, Figure 1 is a view illustrating my harpoon connected with its coöperating rig; Fig. 2 is a side elevation of one form thereof; Fig. 3 is a plan view; Figs. 4 and 5 are cross-sections on the lines 4—4 and 5—5 respectively of Fig. 3; Fig. 6 is a plan view of another form of my invention; and Fig. 7 is a longitudinal section thereof, partly in exterior.

In the form shown in Figs. 2 and 3, my harpoon comprises a toggle-iron 10 having a head 11 formed with cutting edges 12 diverging in circular arcs from the point 13 toward continuing flattened edges 14; the latter in turn converge each along two different angles of inclination from their points of connection with said cutting edges in a direction away from the point 13 and toward the intermediate portion of the toggle-iron 10 as shown in Fig. 3. The head 11 is transversely curved as indicated in Fig. 4 and has its opposite faces tapering along longitudinally curved lines as shown in Fig. 2. The toggle-iron further includes a tail 15 having two outwardly diverging wings or members 16 curved upwardly in the position shown in Fig. 2; a transverse section is located between the wings 16 and is formed with converging surfaces 17 and 18, the surface 17 being inclined at a relatively slight angle while the surface 18 is inclined at a relatively steeper angle as shown in Fig. 7.

The intermediate portion of the iron is fitted between lugs 19 located at one end of a shank 20 and is pivotally connected therewith by means of a pivot screw 21; the latter is constructed and combined with the lugs 19 in such a manner that its screw-threaded end lies entirely within one of said lugs 19 as shown in Fig. 5 whereby the danger of shearing off the said screw is reduced to a minimum. The shank 20 is provided with a recess 22 for the accommodation of the trigger-latch 23 pivoted therein at 24; the latch 23 is formed with a shoulder 25 and with a continuing member 26 as shown in Fig. 2. In its inoperative position the trigger-latch 23 lies entirely within the recess 22 as shown in Fig. 7; when in its operative position the trigger occupies the position shown in Fig. 2 with the shoulder 25 in engagement with the iron 10 and the member 26 projecting outwardly beyond said iron at an inclination toward the point 13. A spring 27 is located within the recess 22 and is arranged to engage the iron 10 and swing it on its pivot 21 after the trigger-latch 23 has been disengaged in the manner to be more fully described hereinafter; in addition to its other functions the spring 27 serves to take up any wear between the trigger-latch 23 and the face of the toggle-iron 10 at the point of contact. The shank 20 is further provided with depressions 28 shaped to correspond to the form of the tail 15 and arranged to accommodate the latter when the toggle-iron is in position for casting as shown in Fig. 2. In addition, the shank 20 is formed at its inner end with a socket 29 adapted to receive the reduced neck 30 of the pike 31 which is rigidly attached to the customary pole 32 to which the bib-line 32ᵃ is attached in the usual way; when the pike 31 is connected with the shank 20 the annular shoulder 33 of said pike formed at the neck 30 rests against the end of said shank while the end of the neck 30 is in engagement with the bottom wall of the socket 29 as shown in Fig. 3. The stress of the stroke when the harpoon is cast, is thus evenly distributed upon the annular shoulder 33 and upon the end of the neck 30 whereby the possibility of forcing the pike 31 into the socket 29 and the consequent jamming of the parts, whereby separation of the iron from the pike at the proper time might be interfered with, is entirely obviated. In order to prevent relative rotation of the shank 20 and the pike 31 and its pole 32 or, in other words, to avoid rotative movement of the iron relatively to the combined pike and pole, about its axis, the pike 31 is provided with preferably semi-circular projections 34 which fit into correspondingly shaped recesses 35 located at the inner end of the shank 20. The projections 34 may comprise integral parts of the pike 31 or they may be formed by driving a circular pin through said pike in such a manner that the shoulder 33 is in registry with the center of said pin; it will, of course, be apparent that the projections 34 may be located on the shank 20 and the recesses 35 on the pike 31 if this should be desired, the suggested arrangement being a mere reversal of the one illustrated. As indicated in Figs. 2 and 3, the iron is provided with an aperture 36 which extends transversely through the shank 20 and whereby one end of the main line 37 is connected with the iron; in the operative condition of the harpoon and prior to the cast, this main line is detachably connected with the pole by being passed and held, in the form of a bight 37$^a$, beneath the customary clamping device 32$^b$ located at an intermediate portion of the pole 32 in the well known way. The opposite end of the main line 37 is secured to a keg or float, also in the customary manner.

In the form shown in Figs. 6 and 7, the head 11$^a$ of the toggle-iron 10 is cut away to form a reduced portion 10$^a$ which is recessed to receive the ends of flukes 14$^a$, the latter being pivotally connected at 14$^b$ with said portion 10$^a$ as shown. In their inoperative condition, the flukes 14$^a$ occupy the positions shown in Fig. 6 in which all parts thereof are located within the confines of the terminal ends of the cutting edges 12; when swung to their operative positions, as will be hereinafter more fully described, the flukes 14$^a$ are located as indicated by dotted lines in Fig. 6, and form outwardly diverging continuations of the cutting edges 12. As illustrated in Figs. 6 and 7, the invention includes a link 38 having pivot members 39 which extend toward each other in a suitable opening in the shank 20; a relatively small screw 40 serves to draw the two members 39 together and to maintain them in proper connection with the shank 20. The link 38 is formed with the aperture 36$^a$ in which the one end of the controlling line 37 may be secured and with an opening 36$^b$ for the accommodation of a strap of heavy webbing or the like, which is sometimes substituted for the line 37. Any suitable method may be followed in constructing and connecting the link 38; for instance, said link may be cast in one piece, preferably so as to be slightly wider at one end than at the other when cast and then sawed through to form the pivot members 39 which are sprung into the aperture of the shank 20 and forced together to take up the width of the saw-cut whereby the slight difference in width is also taken up, the members 39 being held in face to face engagement by the screw 40. In all other respects the form of my invention illustrated in Figs. 6 and 7 may be the same as the one shown in Figs. 1, 2 and 3. The use of the link 38 is of advantage in that it causes the shank 20 to act, in itself, as a toggle and under a backward strain to have a tendency to swing across the line of its original path as will be more fully explained further on.

In utilizing my invention, the iron is connected with the pike 31 and its pole 32 by inserting the neck 30 into the socket 29 and the projections 34 into the recesses 35; it will be understood that the bib-line 32$^a$ having its one end connected to the pole 32, has its other end fastened to a suitable part of the front or bow of the fishing boat in the usual way and that the controlling line 37 is properly connected either directly with the shank 20 or with the link 38 and arranged to freely disengage itself from the pole in the customary manner. The toggle-iron 10 is locked in the position shown in Fig. 2 against the tension of the spring 27, by means of the trigger-latch 23, the shoulder 25 of which extends over the tail 15 at a point between the wings 16 and in registry with the surface 17; it will be noted in this condition of the parts, that the member 26 of the trigger-latch 23 occupies a forwardly inclined position, as shown in Fig. 2. When locked in this casting position, the toggle-iron 10, and particularly the head thereof, is in axial registry with the shank 20, member 31 and pike 32, the wings 16, however, extending beyond said shank 20 in a curve, as shown in Fig. 2. The casting or throwing of the harpoon is done in the usual way to cause the iron to embed itself in the fish; as the latter is struck, it generally darts off immediately, thus carrying the iron along with it. This finally causes the bib-line 32$^a$ to become taut and to exert a pull upon the pole 32; as a result of this pull, the neck 30 and the projections 34 of the pike 31 are withdrawn respectively from the socket 29 and recesses 35 respectively whereby the iron is disconnected and separated from the pike 31. This separation of the iron from the pike also causes a strain upon the line 37 whereby the bight 37$^a$ is pulled from beneath the device 37$^b$ and the line 37 thus detached from the pole 32; the latter with its pike 31 is recovered by simply drawing in the bib-line 32$^a$. As the iron penetrates into the fish, the member 26 will finally come into contact therewith and, by the continued penetration whereby a rearward pressure is applied to said member 26, will pivotally swing the trigger-latch 23 into the recess 22 in which it is completely contained. Thus, the moment the backward strain is exerted upon the holding line 32ª, the toggle-iron 10 will swing on its pivot 21 to approximately the position shown in dotted lines in Fig. 2, this swinging movement of the iron 10 being accelerated by the action of the spring 27, as will be readily apparent. In this position, the device holds against withdrawal under such strains as are ordinarily exerted because of the efforts of the fish to escape; the latter is finally drawn to the boat by means of the controlling line 37. It will be understood that the toggle-iron 10 will swing on its pivot 21 even if the shank 20 is not separated from the pike, so that my harpoon will function even if the pike should become jammed in the socket 29; this is not so in existing harpoons in which a separation of the iron from the pike must first be effected before said iron is capable of any pivotal movement. The toggle-iron 10 in shifting to the position at substantially right angles to the line of entry, loses only a distance equal to that from the pivot 21 to the point 13 or in other words, in a sword-fish iron, about two inches from the farthest point to which it has penetrated. The danger of withdrawing the iron from the fish before the toggle-iron has had a chance to change its position is thus practically avoided with the result that comparatively no fish are lost from this cause. In the form in which the link 38 is used the shank 20 is also capable of a pivotal movement on the pivots 39 as soon as separation from the pike has been brought about, thus providing a double toggle arrangement in which the shank 20, under the backward strain of the line, tends to swing across the line of its original entry whereby the efficiency of the device is still further increased.

The form of my invention shown in Figs. 6 and 7, operates and functions in the same way as the form first described, the flukes 14ª, because they are pivotally movable inwardly to a position entirely within the confines of the cutting edges 12, offering no additional resistance upon entry of the iron into the fish. Any movement tending to withdraw the iron, however, causes the flukes 14ª to spread and thus to resist such backward movement as will be apparent. This form of my invention is particularly useful if the fish is but lightly struck, that is, not hard enough to bury the tail 15 and wings 16 of the toggle-iron 10. In such cases there is every probability that the movable flukes 14ª will catch under a sinew or bone and thus prevent the iron from being withdrawn so that the possibility of losing the fish, even under such conditions, is reduced to a minimum.

With existing irons many fish are lost through being "boned" or in other words, struck directly on the back-bone; this is due to the fact that the usual iron, because of its shape, that of a true triangle or conventional arrow-head, acts as a wedge and thus becomes increasingly difficult to drive into the bone as it progresses. This disadvantage is entirely avoided with my device which, because its cutting edges 12 are arcs of circles, acts like a chisel and either cuts completely through the back-bone or chips off a piece and proceeds on its course. In other words, it represents the difference between striking a hard bony substance with a pointed wedge and doing little or no damage or with a chisel having wide, quick cutting edges whereby said substance is readily cut.

Furthermore, with my device, the full width of the incision is reached when the toggle-iron has penetrated to a relatively slight depth, for instance, approximately one inch, whereas with existing irons the full width of the cut is obtained in double this distance.

As previously stated and as illustrated, the trigger-latch 23 is so constructed that the member 26 thereof rakes forward when the latch is in the operative position shown in Fig. 2; thus, as the iron is forced forward, this member 26 tends to assume a position at right angles to the line of entry and thereby exposes its greatest leverage to the resistance of the flesh at the moment of unlocking entirely. As the unlocking movement of the latch 23 is commenced, the surface 17, because of its inclination, will act as a cam upon the surface of the shoulder 25 and will thus assist the movement of the latch 23 to its inoperative position. The moment the trigger-latch 23 is unlocked, the spring 27 forces the toggle-iron 10 upward and thus positions that portion thereof which lies between the wings 16 beyond the reach of the shoulder 25, even if the trigger-latch 23 should by any chance be forced forward again; while such a contingency might arise it is unlikely because the trigger-latch, in its inoperative position, is entirely within the recess 22 and is thus countersunk in the shank 20. Furthermore, after the spring 27 has lifted the toggle iron, which it cannot do until the trigger-latch is completely released, any tendency of the latter to return to its operative position will cause the member 26 to exert a pressure against the surface 18. Because of the relatively steep inclination of this surface 18, this pressure of the member 26 thereon resolves itself into a camming action, whereby a powerful leverage is exerted on the toggle-iron 10 which serves to force the latter away from the latch 23, thus rendering unintentional re-locking of said iron substantially impossible.

The inclination or angle of the lower face of the heads 11 and 11ª, rising gradually to the point 13, causes the flesh of the fish to exert an upward camming action which has a tendency to maintain the toggle-iron in substantially the position shown by full lines in Fig. 7, even though it is unlatched, as long as the motion of the iron is progressive. This tendency is increased by the downward pressure of the flesh upon the tail 15 and wings 16 at substantially all points to the rear of the point 21.

The projections 34 and the coöperating recesses 35 comprise a means whereby rotation of the iron relatively to the pike is prevented and which in no way interferes with the withdrawal of the neck 30 from the socket 29; this feature is desirable though not absolutely necessary.

My device may be constructed of any suitable material which does not rust and is not affected by the action of salt water; I have found hard bronze or composition metal satisfactory.

The chief purpose for which my harpoon is intended is the capture of sword fish, although it may be used with equal efficiency in the capture of any aquatic animal when a harpoon is required; it will be understood that the size of the device and its details of construction vary in accordance with the strength of the animal upon which it is to be used.

My invention is extremely simple in construction and efficient in operation, overcomes the danger of jamming whereby separation of the iron from the pike at the proper time is interfered with and thus avoids the possibility of losing the fish because of unintentional withdrawal of the iron after the harpoon has been driven home.

Various changes in the specific forms shown and described may be made within the scope of the claims without departing from the spirit of my invention.

I claim:

1. A harpoon comprising a member having a socket at one end and a recess, a pike having an end detachably fitted into said socket, a toggle-iron pivotally mounted at the other end of said member, a trigger-latch whereby said toggle-iron is locked against pivotal movement said trigger-latch being released by contact with the fish and being movable to an inoperative position into said recess, and a spring whereby said toggle-iron is swung on its pivot after said trigger-latch is released.

2. A harpoon comprising a member having a socket at one end and a recess, a pike having an end detachably fitted into said socket, a toggle-iron pivotally mounted at the other end of said member, a trigger-latch whereby said toggle-iron is locked against pivotal movement, said trigger-latch being released by contact with the fish, and being movable to an inoperative position into said recess, means on said toggle-iron whereby the movement of said trigger-latch into said recess is accelerated and a spring whereby said toggle-iron is swung on its pivot after said trigger-latch is released.

3. A harpoon comprising a member having a socket at one end and a recess, a pike having an end detachably fitted into said socket, a toggle-iron pivotally mounted at the other end of said member, a trigger-latch whereby said toggle-iron is locked against pivotal movement, said trigger-latch being released by contact with the fish, and being movable to an inoperative position into said recess, a spring whereby said toggle-iron is swung on its pivot and a cam-member on said toggle-iron whereby a return movement of the latter will force the trigger-latch in a direction toward its inoperative position.

4. A harpoon comprising a pike, a member detachably connected therewith and a toggle-iron pivotally connected with said member and having a head provided with cutting edges comprising circular arcs which intersect each other to form the point, the opposite surfaces of said toggle-iron being convex between said cutting edges and converging along convex lines toward said point.

5. A harpoon comprising a pike, a member detachably connected therewith, a toggle-iron pivotally connected with said member, a tail constituting an integral part of said toggle-iron and provided with diverging wings, the one surface of said tail and wings being flat and curved outwardly in the direction of the length of said toggle-iron and a locking-device pivotally connected with said member and arranged to engage said tail between said wings to lock said toggle-iron against pivotal movement, said device being released by contact with the fish and the flat, outwardly curved surface of said tail and wings being acted on by the flesh of the fish to maintain said toggle-iron against pivotal movement after the locking device has been released and as long as the motion of said iron in the fish is progressive.

6. A harpoon comprising a pike, a member detachably connected therewith, a toggle-iron pivotally connected with said member and having a cutting-head and devices movably connected with said toggle-iron, said devices being located entirely within the confines of said head in inoperative positions and being movable to operative positions so as to extend beyond and form outward continuations of said head.

7. A harpoon comprising a pike, a member detachably connected therewith, a toggle-iron pivotally connected with said member and having a cutting-head and flukes pivotally connected with said toggle-iron said flukes being located entirely within the confines of said head in inoperative positions and being pivotally movable to operative positions so as to extend beyond and form outward continuations of said head.

8. A harpoon comprising a pike, a member detachably connected therewith, a toggle-iron pivotally connected with said member and a link pivotally connected with said member, said link having an aperture arranged to accommodate a line and an opening arranged to accommodate a strap.

In testimony whereof I have hereunto set my hand.

F. GILBERT HINSDALE.